US007303804B2

(12) United States Patent
Yoshida

(10) Patent No.: US 7,303,804 B2
(45) Date of Patent: Dec. 4, 2007

(54) PILE CLOTH FOR CLEANING

(75) Inventor: Norio Yoshida, Osaka (JP)

(73) Assignee: N.I. Teijin Shoji Co., Ltd., Osaka (JP)

( * ) Notice: Subject to any disclaimer, the term of this patent is extended or adjusted under 35 U.S.C. 154(b) by 253 days.

(21) Appl. No.: 10/491,171

(22) PCT Filed: Apr. 7, 2003

(86) PCT No.: PCT/JP03/04403

§ 371 (c)(1),
(2), (4) Date: Mar. 30, 2004

(87) PCT Pub. No.: WO03/087450

PCT Pub. Date: Oct. 23, 2003

(65) Prior Publication Data

US 2005/0031828 A1 Feb. 10, 2005

(30) Foreign Application Priority Data

Apr. 12, 2002 (JP) ............................ 2002-110229

(51) Int. Cl.
*B32B 33/00* (2006.01)
*D02G 3/22* (2006.01)
*D02G 3/38* (2006.01)

(52) U.S. Cl. .......................... 428/92; 428/97; 428/375; 428/377

(58) Field of Classification Search .................. 428/92, 428/97, 375, 377
See application file for complete search history.

(56) References Cited

U.S. PATENT DOCUMENTS

| | | | | | |
|---|---|---|---|---|---|
| 2,849,785 | A | * | 9/1958 | McCullough et al. | 428/97 |
| 2,901,005 | A | * | 8/1959 | Schwartz | 139/420 B |
| 4,018,042 | A | * | 4/1977 | Maag et al. | 57/210 |
| 4,154,881 | A | * | 5/1979 | Hirakawa et al. | 428/92 |
| 4,330,989 | A | * | 5/1982 | Schmieder et al. | 57/227 |
| 4,454,196 | A | * | 6/1984 | Iohara et al. | 428/359 |
| 4,668,552 | A | * | 5/1987 | Scott | 428/92 |
| 4,668,553 | A | * | 5/1987 | Scott et al. | 428/92 |
| 4,711,191 | A | * | 12/1987 | Schwartz | 112/410 |
| 5,010,723 | A | * | 4/1991 | Wilen | 57/210 |
| 5,307,614 | A | * | 5/1994 | Nabeshima et al. | 57/207 |
| 5,735,110 | A | * | 4/1998 | Kruger et al. | 57/224 |
| 5,786,083 | A | * | 7/1998 | Harris | 428/373 |
| 5,887,416 | A | * | 3/1999 | Shimono et al. | 57/236 |
| 6,023,926 | A | * | 2/2000 | Flynn | 57/210 |
| 6,106,921 | A | * | 8/2000 | Lancaster | 428/92 |
| 6,468,622 | B1 | * | 10/2002 | Combs et al. | 428/92 |
| 6,658,835 | B1 | * | 12/2003 | Bowers | 57/210 |
| 7,134,265 | B2 | * | 11/2006 | Shigemura | 57/225 |
| 2004/0020183 | A1 | * | 2/2004 | Bowers | 57/210 |
| 2004/0020184 | A1 | * | 2/2004 | Bowers | 57/228 |
| 2004/0168426 | A1 | * | 9/2004 | Shigemura | 57/225 |

FOREIGN PATENT DOCUMENTS

| | | | | |
|---|---|---|---|---|
| JP | 74003457 | B | * | 1/1974 |
| JP | 58018453 | A | * | 2/1983 |
| JP | 58-171265 | | | 10/1983 |
| JP | 01040636 | A | | 2/1989 |
| JP | 01260029 | A | * | 10/1989 |
| JP | 3-27149 | | | 2/1991 |
| JP | 03241058 | A | * | 10/1991 |
| JP | 04034051 | A | * | 2/1992 |
| JP | 04-282123 | | | 10/1992 |
| JP | 5-32049 | | | 5/1993 |
| JP | 05179527 | A | * | 7/1993 |
| JP | 7-82656 | | | 3/1995 |
| JP | 9-67731 | | | 3/1997 |
| JP | 2000-34636 | | | 2/2000 |
| JP | 2001-128914 | | | 5/2001 |
| WO | WO 90/00209 | | | 1/1990 |

* cited by examiner

*Primary Examiner*—Cheryl A. Juska
(74) *Attorney, Agent, or Firm*—Sughrue Mion, PLLC

(57) ABSTRACT

A pile fabric comprises a base fabric and a pile layer composed of many cut piles extending from at least one face of the base fabric, and has a pile length of from 2 to 30 mm. The pile yarns forming the cut piles are core-sheath type composite yarns each comprising a core portion composed of thick fibers (preferably filaments) having a single fiber size of from 5 to 55 dtex and a sheath portion that is composed of thin fibers (preferably filaments) having a single fiber size of from 0.01 to 2.5 dtex, and that surrounds and covers the core portion. The pile fabric is excellent in the dust removal effect during wiping, and resistance to laying flat, and is useful as a fabric for cleaning.

7 Claims, 3 Drawing Sheets

PILE CLOTH FOR CLEANING

TECHNICAL FIELD

The present invention relates to a pile fabric for cleaning. The present invention relates, in more detail, to a pile fabric for cleaning having a pile layer excellent in a dust removing effect when wiping and the pile layer being resistant to laying flat.

BACKGROUND ART

As disclosed in, for example, Japanese Examined Patent Publication (Kokoku) No. 5-32049 and Japanese Unexamined Patent Publication (Kokai) No. 3-27149, raised fabrics containing extremely thin fiber yarns or loop pile towel fabrics formed from extremely thin fiber yarns have been used as dish cloths for cleaning, wiping cloths for eyeglasses, and the like. Although the raised layer or loop pile layer formed from the above extremely thin fibers shows a good effect when wiping, resistance of the pile layer to laying flat is inadequate, and the raised fibers or loop piles of the raised layer or loop pile layer are laid flat. As a result, problems, that the friction resistance increases during wiping and the wiping effect decreases, occur. The decrease in the effect is more significant when the fabric for wiping is in a wet state than when it is in a dry state. Furthermore, Japanese Unexamined Patent Publication (Kokai) No. 7-82656 discloses, for example, that an air interlaced combined yarn containing a crimped yarn can be used as a pile yarn for the purpose of improving the resistance of a loop pile layer to laying flat. When such a fabric having a pile layer formed from a crimped yarn-containing combined yarn is used for cleaning applications, the resistance of piles to laying flat is improved. However, the problem that the dust removal effect of wiping is still insufficient, remains.

A pile fabric for cleaning having a pile layer excellent in both the dust removal effect during wiping and having a pile layer resistant to laying flat has never been known. Development of a pile fabric for cleaning having the above properties has therefore been desired.

DISCLOSURE OF THE INVENTION

An object of the present invention is to provide a pile fabric for cleaning having a pile layer excellent in the dust removal effect during wiping and resistant to laying flat.

A pile fabric for cleaning, of the present invention, comprises a woven or knitted base fabric and a plurality of pile yarns woven or knitted into the base fabric, a plurality of portions of the pile yarns being extended from at least one face of the base fabric to form a plurality of cut piles, thereby forming a pile layer, the pile yarns each having a core-sheath type composite structure, the core portion of any of the pile yarns being formed from at least one core-portion forming yarn composed of at least one type of and a plurality of thick fibers having a single filament size of from 5 to 55 dtex, and the sheath portion that surrounds the core portion being formed from at least one sheath portion-forming yarn composed of at least one type of and a plurality of thin fibers having a single fiber size of from 0.01 to 2.5 dtex, the cut piles that extend from the base fabric face having a pile length of from 2 to 30 mm.

The pile fabric for cleaning, of the present invention, wherein the at least one sheath portion-forming yarn is wound around the periphery of the core portion composed of the at least one core portion-forming yarn in the core-sheath type composite yarn so that a single layer covered twist yarn structure is formed.

The pile fabric for cleaning of the present invention, wherein the at least two sheath portion-forming yarns are wound around the periphery of the core portion composed of the at least one core portion-forming yarn in at least two layers in the core-sheath type composite yarn so that a multilayer covered twisted yarn structure is formed.

The pile fabric for cleaning of the present invention, wherein a portion of the thick fibers of the core portion and a portion of the thin fibers of the sheath portion in the core-sheath type composite yarn are entangled with each other.

The pile fabric for cleaning of the present invention, wherein the thick fibers for a core portion of the core-sheath type composite yarn is selected from natural vegetable fibers, natural animal fibers, regenerated fibers, semi-synthetic fibers and synthetic fibers.

The pile fabric for cleaning of the present invention, wherein the thin fibers for a sheath portion of the core-sheath type composite yarn is selected from polyester, polyamide, poly(vinylidene chloride) and polypropylene fibers.

The pile fabric for cleaning of the present invention, wherein the sheath portion-forming yarn of the core-sheath type composite yarn is selected from multifilaments yarns.

The pile fabric for cleaning of the present invention, wherein the sheath portion-forming multifilaments yarn of the core-sheath type composite yarn is false twisted and crimped, TASLAN®, air jet texturing treated, and/or interlaced.

The pile fabric for cleaning of the present invention, wherein the sheath portion-forming yarn of the core-sheath type composite yarn is formed from 100 to 1,500 multifilaments.

The pile fabric for cleaning of the present invention, wherein the fabric comprises a hot-melt adhesive fiber containing a thermoplastic synthetic resin that has a melting point of from 80 to 150° C.

The pile fabric for cleaning of the present invention, wherein the fabric has a pile layer only on the front surface, and a coating layer of water-permeable resin is further formed on the back surface.

BEST MODE FOR CARRYING OUT THE INVENTION

Figure 1:
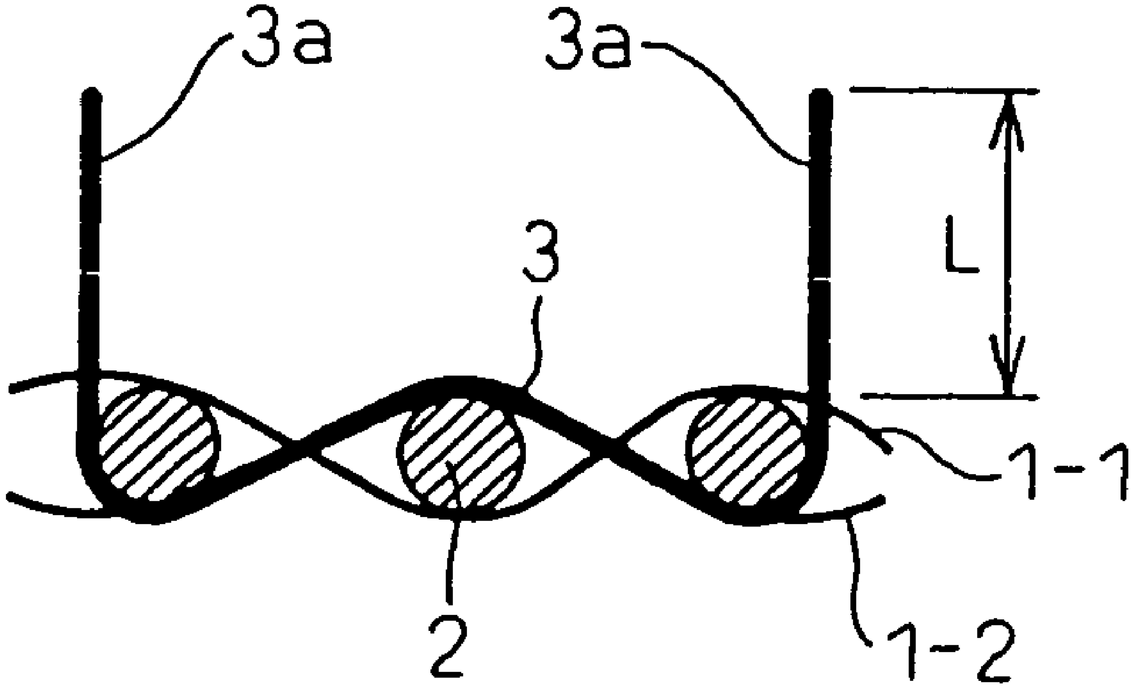
FIG. 1 is a cross-sectional explanatory view showing one embodiment of the structure of a pile fabric for cleaning, of the present invention.

A pile fabric for cleaning of the present invention comprises a base fabric composed of a woven or knitted fabric and a plurality of pile yarns woven or knitted into the base fabric, and a plurality of portions of the pile yarns are extended from at least one face of the base fabric to form a plurality of cut piles, whereby the cut piles form a pile layer.

The pile yarns have a core-sheath type composite structure: the core portion of any of the pile yarns is formed from at least one core-portion forming yarn composed of at least one type of, and a plurality of, thick fibers having a single fiber size of from 5 to 55 dtex, preferably from 10 to 35 dtex; and the sheath portion that surrounds the core portion is formed from at least one sheath portion-forming yarn composed of at least one type of and a plurality of thin fibers having a single fiber size of from 0.01 to 2.5 dtex, preferably from 0.1 to 1.5 dtex.

For the pile fabric for cleaning of the present invention, the pile layer may be formed only on one side of the base fabric, or on both sides thereof. In general, in order to prevent pile yarns from being raveled from the base fabric and to reduce the production cost of the pile fabric for cleaning, it is preferred that the pile layer be formed only on one side of the base fabric and the base fabric have no pile layer on the back surface (opposite surface). The back surface (non-pile layer surface) may optionally be subjected to yarn raveling-preventive treatment for the pile yarns, for example, a backing layer may be formed.

The pile layer of the pile fabric of the present invention is formed from a plurality of cut piles alone, and contains no loop piles. When the pile layer contains loop piles, dust sticking to the loop piles is hardly removed; moreover, loop piles are engaged with protruded portions or protruded articles on the floor or the like during cleaning, and a smooth cleaning operation tends to be hindered.

The cut piles extending from the base fabric in the pile fabric of the present invention has a pile length of from 2 to 30 mm, preferably from 6 to 25 mm. When the pile length is less then 2 mm, the pile fabric thus obtained has insufficient properties of dust removal by wiping. When the pile length exceeds 30 mm, the cut piles are entangled with each other. As a result, the wiping operationability becomes inadequate, and the dust removal effect of wiping becomes insufficient.

FIG. 1 shows the cross section of a warp pile woven fabric as one embodiment of a pile fabric for cleaning of the present invention. A warp pile yarn 3 is woven into a base fabric composed of base warp yarns 1-1, 1-2 and base weft yarns 2. A plurality of portions of the warp pile yarn 3 are extended from one surface of the base fabric to form cut piles 3*a* having a pile length of L.

The pile fabric may be either a warp pile woven fabric as shown in FIG. 1 or a weft pile woven fabric, or a pile knitted fabric. The pile length of the cut piles may be either uniform or nonuniform as long as the pile length is from 2 to 30 mm.

Each pile yarn forming the pile layer in the pile fabric of the invention is a core-sheath type composite yarn composed of a core portion that is formed from a plurality of thick fibers having a single filament size of from 5 to 55 dtex and a sheath portion that is formed from a plurality of thin fibers having a single filament size of from 0.01 to 2.5 dtex and surrounds the periphery of the core portion. When the single fiber size of the thick fibers forming the core portion is less than 5 dtex, the resistance of the cut piles thus obtained to laying flat becomes inadequate, and the wiping operationability of the pile fabric thus obtained becomes insufficient. Moreover, when it exceeds 55 dtex, the pile layer shows an excessively high stiffness, and has flexibility insufficient to achieve the following function: the pile layer is deformed in accordance with a face to be wiped, and covers the entire face to be contacted therewith. As a result, the pile layer can slide over the face to be wiped while being only partially contacted therewith, and the dust removal effect of wiping becomes inadequate.

When the single fiber size of the thin fibers forming the sheath portion is less than 0.01 dtex, the thin fibers are easily cut during the use of the pile fabric thus obtained in cleaning operation, and the cut thin fibers form dust. Moreover, when the single fiber size of the thin fibers exceeds 2.5 dtex, the dust removal effect of wiping of the sheath portion in the cut piles thus obtained becomes inadequate.

The following core portion may be used: a core portion formed from one thick fibers yarn; a doubled or twisted yarn prepared from at least two thick fibers yarns equal to or different from each other in composition, thickness and the like, and each thick fibers yarn is formed from single type thick fibers or from at least two types of thick fibers that are mutually combined. The thick fibers forming the core portion preferably have a continuous filamentary shape.

Furthermore, the sheath portion may be formed from one thin fiber yarn, or it may be formed from a doubled or twisted yarn prepared from at least two thin fiber yarns equal to or different from each other in composition, thickness and the like. Each thin fiber yarns may be formed from a single type of thin fiber, or it may be formed from at least two types of thin fiber that are mutually combined. The thin fibers for the sheath portion preferably have a continuous filamentary shape.

When both the core portion and the sheath portion of a pile yarn of the pile fabric in the invention are each formed from a continuous filament yarn, a length difference (length difference of staple fibers) between a core portion-forming filament and a sheath portion-forming filament in each pile of the pile layer is preferably 2 mm or less. When the length of the thick filaments in the core portion of the pile yarns is longer than the length of the thin filaments in the sheath portion by 2 mm or more, the frictional resistance between the surface to be wiped and the pile layer during wiping operation lowers so that the operator is less tired. However, the dust removal effect of wiping decreases, and dust stripes are formed sometimes on the wiping surface. Furthermore, when the thin filaments of the sheath portion in the pile fabrics have a length larger than the larger size filaments in the core portion by 2 mm or more, the friction resistance between the pile layer surface and a surface to be wiped increases. As a result, the operator is likely to be tired, and the tip portions of the small size filaments in the sheath portions are entangled with each other. As a result, dust stripes are formed on the wiped surface.

When a surface to be wiped has recesses and protrusions, or it is a rough surface, or the dust particles to be removed by wiping are large, the dust removal effect of wiping is improved by making the core portion-forming filament of each pile longer than the sheath portion-forming filament by about 1.5 to 0.5 mm. Moreover, when the surface to be wiped has good flatness, the dust removal effect of wiping is enhanced by making the sheath portion-forming filament in each pile have a length about equal to that of the core portion-forming filament.

There is no specific limitation on the type of fibers forming the core portions and sheath portions of composite yarns having a core-sheath structure and used for the pile fabric of the present invention. Examples of the preferably usable fibers include natural vegetable fibers such as cotton and hemp, natural animal fibers such as silk and wool, regenerated fibers such as rayon, semi-synthetic fibers such as cellulose acetate, synthetic fibers such as polyester fibers represented by poly(ethylene terephthalate) fibers and poly (trimethylene terephthalate) fibers, polyamide fibers, poly (vinylidene chloride) fibers and polypropylene fibers. In particular, when at least one of the core portion or sheath portion of the core-sheath type composite fiber contains poly(vinylidene chloride) fiber and/or polypropylene fiber, static electricity is generated by friction between the pile fabric for cleaning and the wiped surface, and the pile fabric exhibits the effect of adsorption removal of dust blown up from the wiped surface.

The above core portion-forming fiber and sheath portion-forming fiber may optionally include one or at least two of the materials that stick to or that are contained in the fibers: fine pore-forming agents, cationic dyeing agents, anti-coloring agents, thermal stabilizing agents, flame retardants, fluorescent brighteners, delustering agents, coloring agents, antistatic agents, hygroscopic agents, antibacterial agents and inorganic fine particles. Moreover, there are no specific limitations on the cross-sectional shape of the single fiber of these fibers. The single filament may have a modified cross-sectional shape such as a circular or triangular shape, or it may have a hollow portion. The fiber may also be a core-sheath type or side-by-side type conjugate yarn.

There is no specific limitation on the shape of yarns forming the core portions and that of yarns forming the sheath portions, and the yarns may be multifilaments or staple fibers. In particular, in order to improve the dust removal effect of wiping, a false-twisted crimped yarn prepared by false twisting and crimping multifilaments are preferably used as a yarn forming the sheath portion. Moreover, TASLAN®, air jet texturing treatment or interlacing may also be employed as crimping treatment. Furthermore, in order to improve the dust removal effect of wiping, a thick and thin fiber yarn showing variation in a single filament size in the yarn length direction, a cospun multifilaments yarn composed of a plurality of filaments differing from each other in a filament size, or a doubled or twisted yarn of at least two multifilaments yarns differing from each other in a single filament size, may be used as a sheath portion-forming fiber.

There are no specific limitations on a total size and a number of filaments of a yarn forming the core portion, and a total size and a number of filaments of a yarn forming the sheath portion. However, in order to enhance the dust removal effect of wiping, the number of filaments of a filaments yarn forming the sheath portion is preferably from 100 to 1,500, more preferably from 790 to 1,050.

The sheath portion of the core-sheath type composite yarn for a pile yarn may also be formed in at least two layers. For example, at least two covering layers composed of sheath portion fiber may be superposed on the periphery of the core portion-forming yarn. Moreover, the core-sheath type composite yarn may optionally contain another fiber such as hot melt-adhesive fiber having a low melting point. Furthermore, the total size of the core-sheath type composite yarn is preferably from 300 to 900 dtex, more preferably from 450 to 650 dtex, though the total size is not limited to these values.

The total size of the core portion in the core-sheath type composite yarn used in the present invention is preferably from 100 to 350 dtex, more preferably from 200 to 300 dtex. The total size of the sheath portion is preferably from 200 to 650 dtex, more preferably from 250 to 450 dtex. Moreover the ratio of the total size of the core portion to that of the sheath portion is preferably from 1:1.3 to 1:1.7, more preferably from 1:1.4 to 1:1.6. When the core portion is too small, the resistance of the pile fabric, for cleaning, to laying flat becomes insufficient, and the effect of cleaning sometimes becomes unsatisfactory. On the other hand, when the sheath portion is too small, the dust removal effect of wiping and the uniformity of the pile fabric for cleaning thus obtained sometimes becomes unsatisfactory.

There is no limitation on the process for producing a core-sheath type composite yarn used for the pile fabric for cleaning of the invention. Examples of the process include a covering process comprising winding a fiber yarn forming the sheath portion around a fiber yarn forming the core portion, a process comprising feeding both a core portion-forming yarn and a sheath portion-forming yarn to an air combining apparatus, combining by blowing an air flow through an air nozzle so that the core portion-forming yarn is situated in the core portion and the sheath portion-forming yarn is situated around the core portion to effect interlacing the yarns, a process for mutually interlacing the yarns, and a process for further false twisting these yarns to effect compositing. Of these processes, the preferred ones include a single covering twisting process comprising covering a core portion fibers yarn with a sheath portion fibers yarn by a conventional covering machine, and a double covering twisting process comprising further covering the composite yarn obtained by the single covering twisting process with a sheath portion fibers yarn. When the covering process is employed, a core-sheath type composite yarn having a definite core-sheath structure can be obtained. A pile fabric produced from the composite yarn exhibits a good dust removal effect during wiping.

In addition, the number of twisting during covering twisting mentioned above is preferably from 300 to 1,500 T/m, more preferably from 450 to 750 T/m. Moreover, when double covering twisting is to be conducted, reversing the direction of first twisting and final twisting cancels the residual torque of the composite yarn thus obtained, and stabilizes the twisted state of the composite yarn.

There is no restriction on the yarns forming the base fabric, for the raised fabric for cleaning, of the present invention. The fiber forming the base fabric may be the same as the fiber forming the pile yarn (core-sheath type composite yarn), or it may be different therefrom. Examples of the fibers include natural fibers such as cotton, silk, hemp and wool, regenerated fibers such as rayon, semi-synthetic fibers such as acetate fibers, synthetic fibers such as polyester fibers represented by poly(ethylene terephthalate) fibers and poly(trimethylene terephthalate) fibers, polyamide fibers, poly(vinylidene chloride) fibers and polypropylene fibers. When such a base fabric contains a heat melt-sticking fiber having a low melting point, the pile yarn is easily melt stuck to the base fabric by heat finish setting, so that the pile yarn is prevented from being raveled without impairing the dehydratability. A heat melt-sticking fiber having a low melting point is a thermoplastic synthetic fiber (such as a fiber of modified polyester, polypropylene or polyethylene) having a melting point of from 80 to 150° C. The heat melt-sticking fiber having a low melting point may be composed of a low melting point polymer alone, or it may be a core-sheath type conjugate fiber in which the sheath component is composed of a heat melt-sticking polymer having a low melting point.

As the shape of a fiber forming the base fabric, the fiber may be a multifilament yarn, or a spun staple fiber. However, in order to improve the dust removal effect of wiping, a false-twisted crimped yarn in which multifilament are false twisted and crimped is preferably used. Moreover, multifilament yarn that is subjected to Taslan treatment or interlacing may also be used as the base fabric-forming yarn. There are no limitations on the total size, number of filaments and single filament size of the fibers yarn forming the base fabric. Moreover, there is no specific limitation on the structure of the base fabric, and a known woven or knitted fabric can be used.

Furthermore, in order to further enhance the yarn raveling-preventive effect of a pile yarn, a pile layer is formed on one side (surface) alone of the base fabric. The other side (back surface) of the base fabric is made a non-pile face. The non-pile back surface is preferably coated with polyurethane or melamine resin. When the coating layer is formed in a dot-like state so that water can be easily permeated, the pile fabric thus obtained shows enhanced dehydratability.

The pile fabric for cleaning of the present invention can be produced by, for example, the following procedure. First, the core-sheath type composite yarn is used as a warp or weft pile yarn, and a loop pile fabric having loop piles is prepared. There is no specific limitation on the fabric structure of the loop pile fabric. Examples of the loop pile fabric include pile woven fabrics such as a one side pile woven fabric, a both side pile woven fabric and a double velvet obtained by a pile weaving machine, and pile knitted fabrics obtained by a tricot knitting machine, a raschel knitting machine, a sinker pile knitting machine or a seal knitting machine. Next, the loop pile fabric is preheat set, dyed and finish heat set. The loop piles of the loop pile fabric are subjected to a shearing treatment and if necessary to a card clothing raising treatment to form a pile layer having cut piles with a desired length. In addition, dyeing may also be carried out after forming a cut pile layer. Moreover, a smoothing agent, an antibacterial agent and/or a disinfectant may be applied, if necessary, to the pile fabric of the invention.

For the pile fabric for cleaning of the present invention produced by the above process, the pile yarns forming the piles each comprise a core portion formed from thick fibers having a large single fiber size and a sheath portion formed from thin fibers having a small single fiber size. As a result, the core portion becomes columns that support the piles, and the uprightness (stiffness) of the piles increases to improve the resistance of the piles to laying flat. At the same time, because the sheath portion of the piles has a small single fiber size, the pile fabric shows an excellent dust removal effect during wiping.

The pile fabric for cleaning of the present invention is useful as a fabric member for use in a cleaning instrument. One embodiment of such a cleaning instrument is illustrated below.

That is, the cleaning instrument has a cleaning fabric member composed of a pile fabric, for cleaning of the invention, a holding member having one face for holding the pile fabric for cleaning, and a fastener that connects the cleaning fabric member and the holding member, the fastener having two connecting face members that are to be removably face connected to each other, one of the connecting face members of the fastener being fixed onto one face of the cleaning fabric member on which the pile layer is not formed, so that the connecting face is situated outside, the other of the connecting face members of the fastener being fixed onto the cleaning fabric holding face of the holding member, so that the connecting face is situated outside, and the cleaning fabric member and the holding member being removably connected to each other through the fastener.

Figure 2:
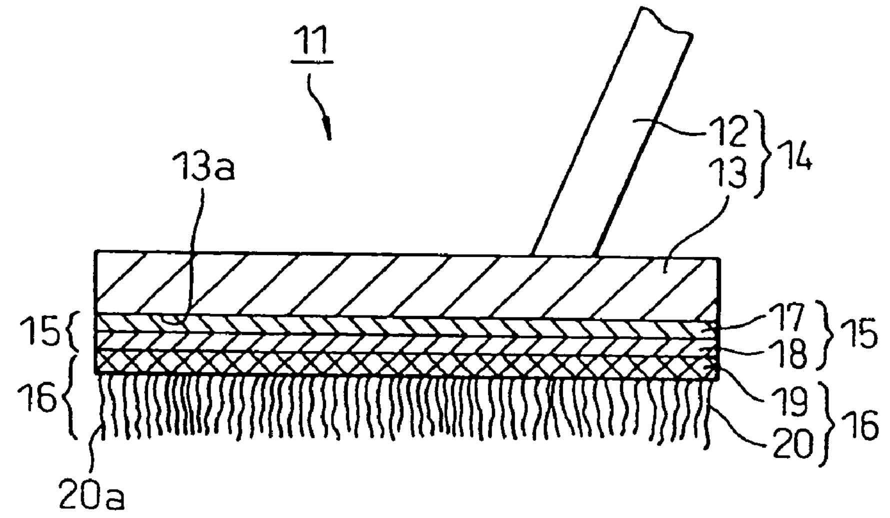
FIG. 2 is an explanatory view showing one embodiment of a cleaning instrument formed from a pile fabric for cleaning, of the present invention.

For example, a cleaning instrument 11 shown in FIG. 2 has a holding member 14 comprising a handle 12 and a fabric holding plate 13 that is fixed to or rotatably connected to the handle 12, and one face 13 a of the fabric holding plate 13 of the holding member 14 and a cleaning fabric member 16 are removably connected together through a fastener 15. The fastener 15 is formed from a fastener connecting face member 17 fixed to the holding member and a fastener connecting face member 18 fixed to the cleaning fabric member 16, and the connecting members 17, 18 are removably face connected together. Moreover, the cleaning fabric member 16 is formed from a base fabric 19 and a pile layer 20 composed of a plurality of cut piles **20*a* extending from one face thereof. The fastener connecting face member 18 is attached to the surface of the cleaning fabric member 16 having no pile layer and is opposite to the pile layer. Accordingly, the two connecting face members 17, 18 of the fastener 15, namely, the connecting face member 17 attached to the holding plate 13 of the holding member 14 can be connected to the connecting face member 18 attached to the cleaning fabric member 16**, and can also be removed therefrom.

For the above fastener, one of the two connecting face members 17, 18 is a loop face member having a base fabric and many loops extending from one face of the base fabric, and the loop face member is fixed onto one face of the above cleaning fabric member not forming the pile layer, so that many loops are situated outside.

The other of the above connecting face members is a hook face member having a base material and many hooks extending from the one face of the base material, and the hook face member is preferably fixed onto the cleaning fabric holding face of the holding member so that the above many hooks are situated outside.

Figure 3:
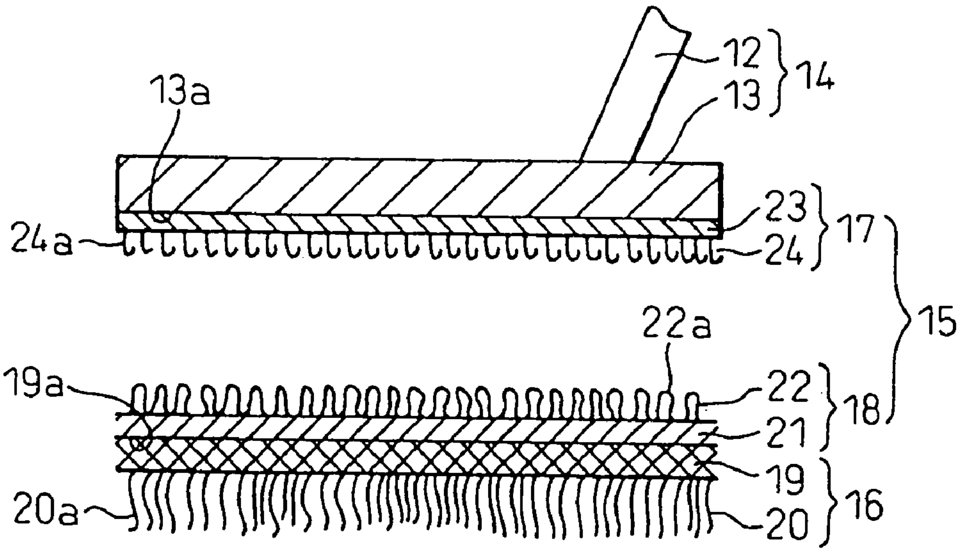
FIG. 3 is a cross-sectional explanatory view showing, in the cleaning instrument shown in FIG. 2, one embodiment in which a cleaning fabric member and a holding member are engaged with and connected to a loop face member and a hook face member forming a fastener, respectively.

For example, as shown in FIG. 3, a loop face member as the connecting face member 18 of the fastener is connected and fixed onto a face **19*a* (not forming the pile layer) of the base fabric 19 of the cleaning fabric member 16. The loop face member 18 is formed from a base fabric 21 and a loop layer 22 composed of many loops 22*a* extending outside from the base fabric, and the base fabric 21 of the loop face member 18 is connected and fixed onto the face 19*a* of the base fabric 19 of the cleaning fabric member 16. Moreover, the hook face member 17 is connected and fixed to the holding face 13*a* of the holding plate 13 of the holding member 14 as the connecting face member of the fastener. The hook face member 17 is formed from a base fabric 23 and a hook layer 24 composed of many hooks 24*a* extending outside the base fabric 23. The fastener 15 is formed from the loop face member 18 and the hook face member 17. The loops 22*a* of the loop face member 18 and the hooks 24*a* of the hook face member 17** can be removably engaged and connected together.

When the loop face member is connected and fixed to the cleaning fabric member in the above cleaning instrument, the base fabric of the loop face member is fixed to the base fabric of the cleaning fabric member by stitching with a sewing yarn. However, when the hook face member is connected to the loop face member, it is preferred that the many hooks of the hook face member are not contacted with portions where the sewing yarn is situated on the base fabric of the loop face member.

Figure 4:
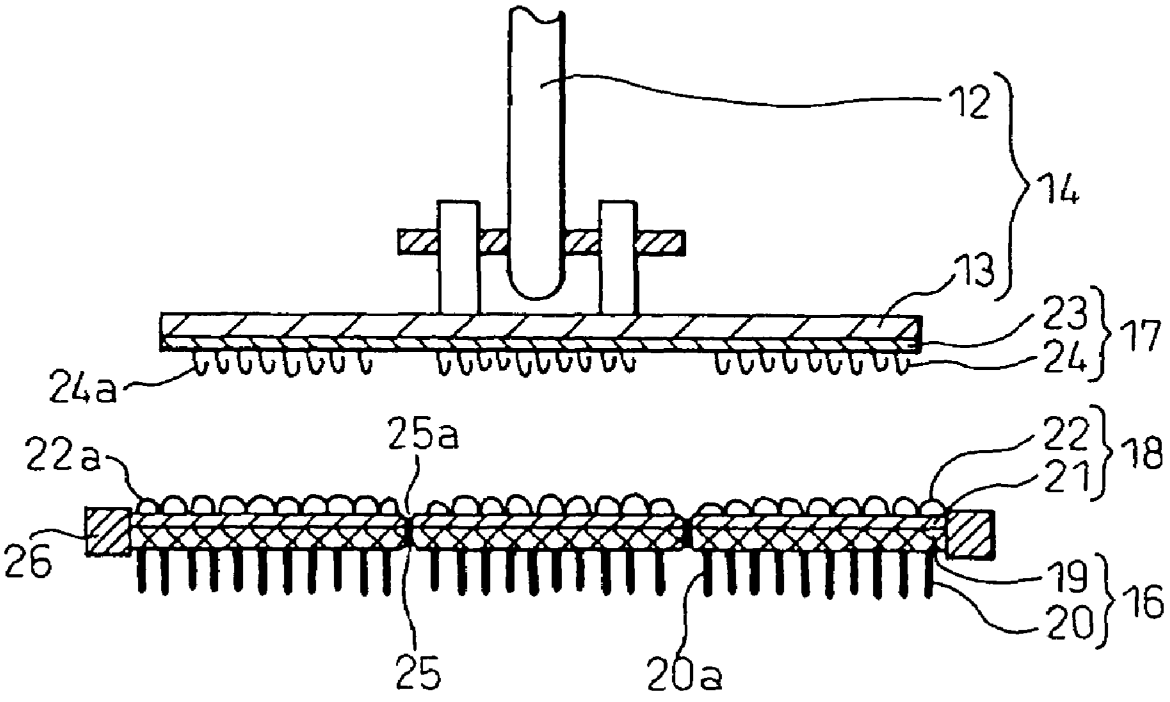
FIG. 4 is a cross-sectional explanatory view showing one embodiment of a cleaning instrument in which a cleaning fabric member for a cleaning instrument composed of a pile fabric for cleaning of the present invention and a loop face member with a loop layer of a fastener are stitched and connected together.

In FIG. 4, the base fabric 19 of the cleaning fabric member 16 and the base fabric 21 of the loop face member 18 are stitched together with a sewing yarn 25 at a plurality of sites 25*a*. The base fabric 21 of the loop face member 18 and the base fabric of the cleaning fabric member are stitched together at the roots of loops 22*a* with the sewing yarn. The sewing yarn never extends into the loop layer 22. Accordingly, when the loops 22*a* of the loop face member 18 and the hooks 24*a* of the hook face member 17 are engaged with and connected to each other, engagement of the hooks 24*a* and the loops 22*a* is not hindered by the contact of the hooks 24*a* with the sewing yarn 25.

Furthermore, as shown in FIG. 4, of the many hooks 24*a*, of the hook face member 17 opposite to the loop face member 18, portions opposite to the stitched portions 25*a* of the loop face member 18 and portions close thereto are preferably removed in advance so that hooks 24*a* are not contacted with the stitched portions 25*a*.

When hooks 24*a* of the hook face member 17 are engaged with and connected to loops 22*a* close to the stitched portions 25*a* of the loop face member 18, the following problem arises: because portions close to the stitched portions 25*a* of the base fabric 21 of the loop face member 18 is hardly moved by stitching, a large force is required to separate the loops 22*a* and hooks 24*a* engaged with each other in the portions. Moreover, when such engagement and separation are repeated, the problem that fluff is formed in the loops 22*a*, and the loops 22*a* are likely to be cut arises. However, when hooks opposite to the stitched portions 25*a* and portions close thereto are removed in advance, the above problems can be solved. Moreover, the peripheral portion 26 of the base fabric 19 of the cleaning fabric member 16 and the base fabric 21 of the loop face member 18 connected to the base fabric 19 may be stitched and reinforced with a sewing yarn. Alternatively, the peripheral portion 26 may be reinforced by a procedure such as wrapping it with a narrow fabric tape and stitching (piping) the wrapped portion with a sewing yarn.

For the cleaning instruments exemplified above, the cleaning fabric members can be optionally separated from the holding members, and replaced. Alternatively, the cleaning fabric members can be washed and used again.

EXAMPLES

The present invention is further explained below by making reference to examples. However, the present invention is in no way restricted thereto. In addition, the properties of a pile fabric for cleaning in examples are measured by the following procedures.

<Dust Removal Effect of Wiping>

First, a black linoleum floor (0.27 $m^2$) is left in a room for two weeks so that dust collects thereon to such a degree that the dust sticks to one's hands. Next, the floor is manually wiped once with a cleaning fabric piece, 37×12 $cm^2$, by a male operator. The dust removal effect of wiping is classified into the following three ranks by seven evaluators.

Excellent: The dust is removed in an amount of 80% or more.

Good: The dust is removed in an amount of from 50% or more to less than 80%.

Not good: The dust is removed in an amount of less than 50%.

<Resistance of Piles to Laying Flat>

A compression force of 1.4 $g/cm^2$ is applied onto the pile layer of a pile fabric with a weight for 10 minutes. The laying flat state of the pile layer subsequent to the removal of the compression force is visually evaluated by seven evaluators, and classified into the following three ranks.

Excellent: Substantially no laying flat of piles is observed.

Good: Laying flat of piles is hardly observed.

Not good: Considerable laying flat of piles is observed.

<Friction between Cleaning Fabric and Floor>

A sample cleaning fabric piece, 37×12 $cm^2$, is placed on a linoleum floor. The floor is manually wiped with the fabric piece by a male operator. The friction resistance is subjected to a sensory evaluation by seven evaluators, and classified into the following two ranks.

Light: The friction resistance is small.

Heavy: The friction resistance is large.

<Uneven Dust Removal by Wiping>

Round trip wiping cleaning is conducted, on a linoleum floor to which dust is stuck, by an operator using a sample cleaning fabric piece, in the same manner as in the above <Dust Removal Effect of Wiping> test. Uneven dust removal is visually evaluated by seven evaluators, and classified into the following three ranks.

Excellent: Substantially no uneven dust removal is observed.

Good: Uneven dust removal is hardly observed.

Not good: Much uneven dust removal is observed.

Example 1

A poly(ethylene terephthalate) multifilament yarn having a yarn count of 220 dtex/10 filaments and a single filament size of 22 dtex was prepared as a filament yarn for forming a core portion. Moreover, a false-twisted crimped yarn of a split type composite multifilament yarn (poly(ethylene terephthalate)/nylon: 50/50%) having a yarn count of 168 dtex/40 composite filaments (1 composite filament capable of being split into 16 extremely thin filaments) was prepared as a filament yarn (1) for forming a sheath portion. The doubled yarn of the following two yarns was prepared as a multifilament yarn (2) for forming a sheath portion: a false-twisted crimped yarn of a poly(ethylene terephthalate) filaments yarn having a yarn count of 84 dtex/72 filaments; and a false-twisted crimped yarn of a split type composite multifilament yarn (poly(ethylene terephthalate/nylon: 50/50%) of 84 dtex/20 composite filaments (1 composite filament capable of being split into 16 extremely thin filaments).

The periphery of the multifilament yarn for a core portion is covered with the multifilament yarn (1) for a sheath portion while a first twist of 600 T/m was being applied thereto in the S direction using a double-covering twisting machine. The resultant covered yarn was further covered with the multifilaments yarn (2) for a sheath portion while a final twist of 600 T/m was being applied to the yarn (2) in the Z direction to give a core-sheath type composite yarn.

Next, a warp double woven fabric having, as a woven fabric density, a base warp yarn density of 163 ends/3.79 cm, a warp pile yarn density of 54 ends/3.79 cm and a base weft yarn density of 53 picks/3.79 cm was prepared from the following yarns: as a base warp yarn of the base fabric, a poly(ethylene terephthalate) false-twisted crimped yarn having a yarn count of 330 dtex/96 filaments; as a base weft yarn of the base fabric, a doubled and twisted yarn (twist number: z 80 T/m) of a poly(ethylene terephthalate) false-twisted crimped yarn and a core-sheath type conjugate hot melt adhesive multifilament yarn (having a yarn count of 280 dtex/16 filaments) that was composed of a poly(ethylene terephthalate) (core component) and a low melting point modified polyester having a melting point of 165° C. (sheath component); and the core-sheath type composite yarn as a warp pile yarn.

The warp double woven fabric was preheat-set with a pin tenter, dyed and then heat-set for finishing. The loop pile layer was then clipping finished to give a pile fabric having a cut pile length of from 9 to 15 mm. Each split type composite filament of the composite multifilaments yarns (1), (2) for a sheath portion was split into 16 extremely thin filaments (for the yarn (1), the single filament size: 0.263 dtex; for the yarn (2), the single filament size: 0.26 dtex) during weaving and treatment steps explained above.

A cleaning fabric piece, 37×12 $cm^2$, was sampled from the pile fabric. The fabric piece was immersed in water, and lightly squeezed. A wood floor was then wiped with the fabric piece to the right and to the left and back and forth (wet procedure). As a result, the following results were obtained: no laying flat of the piles of the pile layer was observed (excellent); the fabric piece could be smoothly moved on the floor (light); and the floor could be cleaned without uneven dust removal by wiping (excellent).

Furthermore, in order to prepare a cleaning instrument with a holding member as shown in FIGS. 2 to 4, a cleaning fabric piece, 37×12 $cm^2$, was sampled from the above pile fabric. Separately, a fastener loop face member having a fastener loop pile layer on a base fabric surface was prepared. The face having no pile layer of the cleaning fabric piece and the face having no loop layer of the loop face member are made to face each other, and stitched to give a cleaning fabric member. Separately, the non-hook layer face of a fastener hook face member having a base fabric and a hook layer on one face of the base fabric was connected and fixed to the outside face of a plastic holding plate having a handle to give a holding member. The pile layer on the cleaning fabric member and the hook layer on the holding member were stacked and engaged with and connected to each other so that a cleaning instrument was assembled. When a floor was cleaned in the same manner (wet procedure) as mentioned above with the cleaning instrument, the following results were obtained: dust removal by wiping was good (good); the resistance of the piles of the pile layer to laying flat was excellent (excellent); the friction resistance between the pile layer and the floor was small (light); and uneven dust removal by wiping was little observed (excellent).

Example 2

A pile fabric for cleaning was prepared in the same manner as in Example 1 except for the following: a 16 split type false-twisted crimped yarn (polypropylene/nylon: 50/50%) of 168 dtex/40 filaments was used as the multifilament yarn (1) for a sheath portion; a 16 split type false-twisted crimped yarn (polypropylene/nylon: 50/50%) of 84 dtex/20 filaments was used in place of the 16 split type false-twisted crimped yarn (poly(ethylene terephthalate)/nylon: 50/50%) of 84 dtex/20 filaments used for the multifilament yarn (2) for a sheath portion; and a poly(ethylene terephthalate) false-twisted crimped yarn was singly used as the base weft yarn of the base fabric. Moreover, the non-pile layer face of the pile fabric thus obtained was coated with a poly-urethane-based resin in a state of many spots (many islands-in-a sea state).

When the floor was wiped with the cleaning fabric piece sampled from the pile fabric thus obtained (dry procedure) to the right and to the left and back and forth, the following results were obtained: fine dust could be removed due to generation of static electricity produced by friction between the cleaning fabric piece and the floor, and the fabric piece was excellent in dust removal by wiping (excellent); no laying flat of the piles was observed (excellent); the fabric piece could be smoothly slid on the floor (light); and the floor could be cleaned of dust without uneven dust removal by wiping (excellent).

Comparative Example 1

A pile fabric for cleaning was prepared in the same manner as in Example 1 except that cut piles were formed only from the filament yarn (1) for a sheath portion and the filament yarn (2) for a sheath portion without using the filament yarn for a core portion.

An operation of dust removal by wiping was carried out with a cleaning fabric piece sampled from the above pile fabric, by a dry procedure by moving the fabric piece on a floor to the right and to the left and back and forth. As a result, laying flat of piles took place, and piles entangled with each other.

Furthermore, the fabric piece for cleaning sampled from the above pile fabric was immersed in water, and lightly squeezed. A floor was wiped with the fabric piece by moving the fabric piece to the right and to the left and back and forth to give the following results: laying flat of the piles took place (not good); and the operationability of cleaning was considerably lowered and uneven dust removal by wiping took place (not good) because the piles laid flat were not recovered from the laying flat state even when the piles laid flat were raised in the direction reverse to the laying flat direction.

INDUSTRIAL APPLICABILITY

The present invention provides a raised fabric for cleaning having both excellent wiping capability and resistance of the piles to laying flat. Such a raised fabric for cleaning can be effectively used while the properties of the fabric is being utilized, for many applications such as mops for wiping floors, mops for wiping walls, wipers for wiping baths, dust removal cloths for car washing, abrasive cloths for painted surfaces, mats for the entrance and mats for the entrance to clean rooms.

The invention claimed is:

1. A pile fabric for cleaning comprising a woven or knitted base fabric and a plurality of pile yarns woven or knitted into the base fabric, a plurality of portions of the pile yarns being extended from at least one face of the base fabric to form a plurality of cut piles, thereby forming a pile layer, the pile yarns each having a core-in-sheath type composite structure, the core portion of each pile yarn being formed from at least one core-portion forming yarn composed of a plurality of thick fibers having a single fiber thickness of from 5 to 55 dtex, the sheath portion that surrounds the core portion being formed from at least one sheath portion-forming multifilament yarn composed of 100 to 1500 thin filaments having a single filament thickness of from 0.01 to 2.5 dtex, and the cut piles that extend from the base fabric face having a pile length of from 2 to 30 mm.

2. The pile fabric for cleaning according to claim 1, wherein in the core-in-sheath type composite pile yarn, the sheath portion-forming multifilament yarn is wound around the periphery of the core portion composed of the core portion-forming yarn to form a single covering layer so that a single layered covering twist yarn structure is formed.

3. The pile fabric for cleaning according to claim 1, wherein in the core-in-sheath type composite pile yarn the at least two sheath portion-forming multifilament yarns are wound around the periphery of the core portion composed of the core portion-forming yarn to form at least two covering layers so that a multilayer covering twisted yarn structure is formed.

4. The pile fabric for cleaning according to claim 1, wherein in the core-in-sheath type composite pile yarn, a portion of the thick fibers in the core portion and a portion of the thin filaments of the sheath portion are entangled with each other.

5. The pile fabric for cleaning according to claim 1, wherein in the core-in sheath type composite yarn, the thick fibers in the core portion are selected from natural vegetable fibers, natural animal fibers, regenerated fibers, semi-synthetic fibers and synthetic fibers.

6. The pile fabric for cleaning according to claim 1, wherein in the core-in-sheath type composite pile yarn, the thin filaments in the sheath portion are selected from polyester, polyamide, poly(vinylidene chloride) and polypropylene filaments.

7. The pile fabric for cleaning according to claim 1, wherein the base fabric comprises hot-melt adhesive fibers comprising a thermoplastic synthetic resin that has a melting point of from 80 to 150° C.

* * * * *